United States Patent [19]

Deutsch et al.

[11] Patent Number: 4,821,497
[45] Date of Patent: Apr. 18, 1989

[54] COTTON HARVESTER AND TANDEM ROW UNIT THEREFOR

[75] Inventors: Timothy A. Deutsch, Newton; Arthur L. Hubbard, Ankeny, both of Iowa

[73] Assignee: Deere & Company, Moline, Ill.

[21] Appl. No.: 233,880

[22] Filed: Aug. 11, 1988

Related U.S. Application Data

[63] Continuation of Ser. No. 935,460, Nov. 26, 1986, abandoned.

[51] Int. Cl.$^4$ .............................................. A01D 46/08
[52] U.S. Cl. ...................................... 56/41; 56/40; 56/30
[58] Field of Search ................... 56/12.4, 12.5, 28, 30, 56/13.3, 40, 41, 44, 48

[56] References Cited

U.S. PATENT DOCUMENTS

| | | | |
|---|---|---|---|
| 2,676,449 | 4/1954 | Smith | 56/41 |
| 2,904,948 | 9/1959 | Hubbard | 56/41 |
| 3,047,996 | 8/1962 | Hubbard | 56/41 |
| 3,757,502 | 9/1973 | Hubbard | 56/41 |
| 4,501,112 | 2/1985 | Thedford et al. | 56/30 |

FOREIGN PATENT DOCUMENTS

| | | | |
|---|---|---|---|
| 197329 | 7/1967 | U.S.S.R. | 56/40 |
| 209116 | 1/1968 | U.S.S.R. | 56/44 |
| 234777 | 6/1969 | U.S.S.R. | 56/44 |
| 247684 | 11/1969 | U.S.S.R. | 56/44 |
| 639489 | 12/1978 | U.S.S.R. | 56/41 |
| 791307 | 1/1980 | U.S.S.R. | 56/48 |

Primary Examiner—John Weiss

[57] ABSTRACT

A cotton picker row unit includes tandem drum structure for harvesting cotton from one side of a row of cotton. A front drum trash slot directs trash and cotton discharged from the front drum into the row and permits the rear drum to pick the discharged cotton. Fore-and-aft spaced discharge doors are located on the side of the unit and are connected so that cotton from the rear door is combined with that from the front door. The combined cotton is conveyed through a single duct to the basket. The tandem drum and side door structure provide a narrow row unit configuration, and a plurality of identical units are spaced on a harvesting frame forwardly of the drive wheels for picking narrow row cotton.

35 Claims, 3 Drawing Sheets

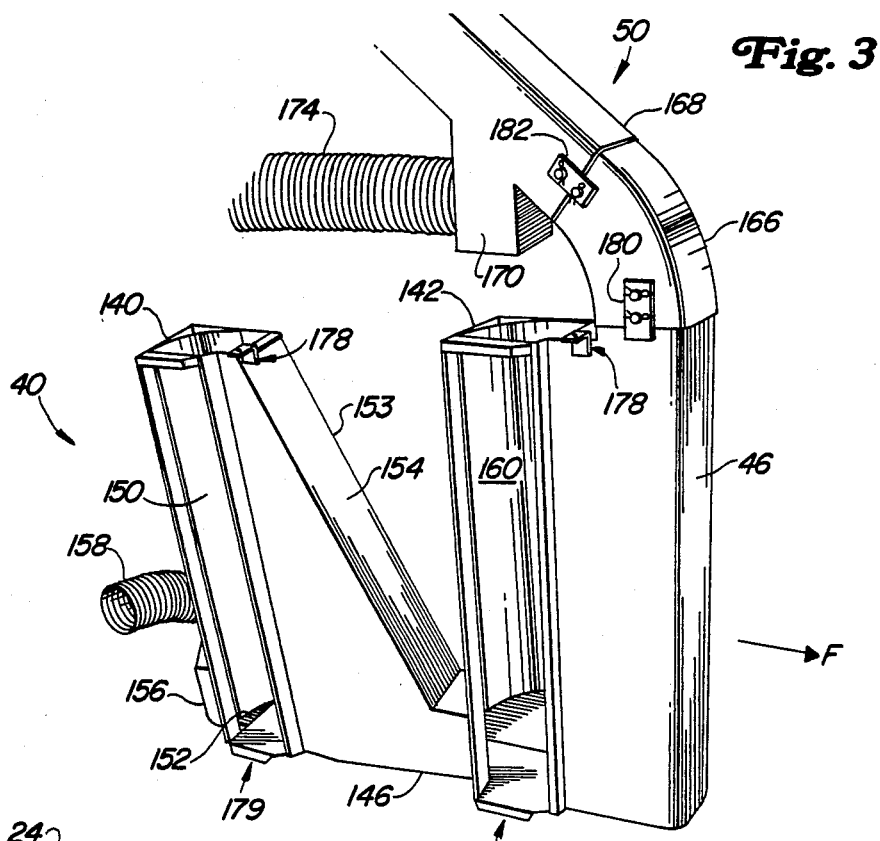
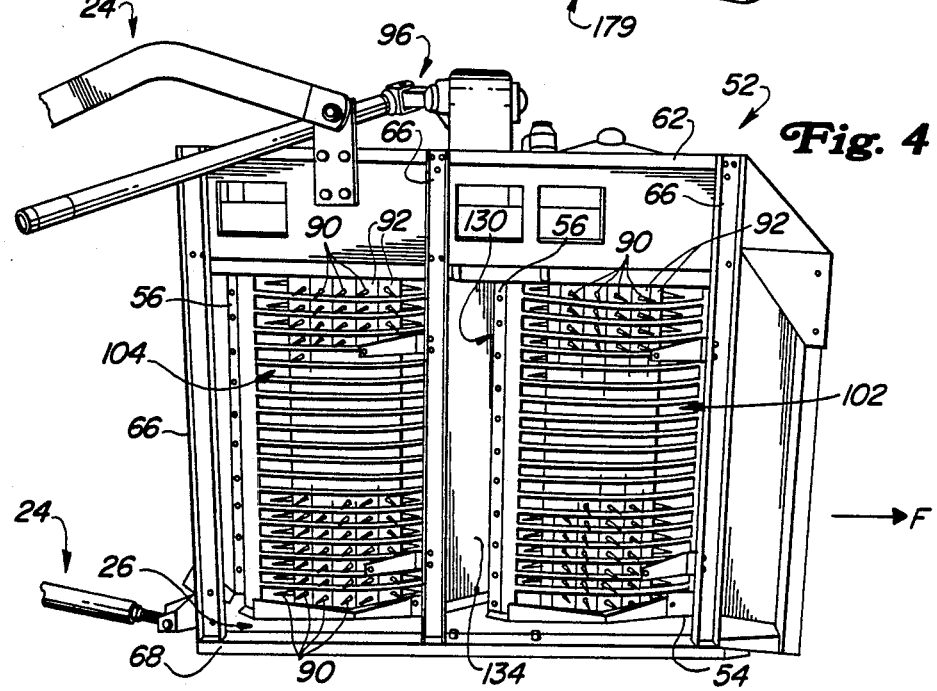

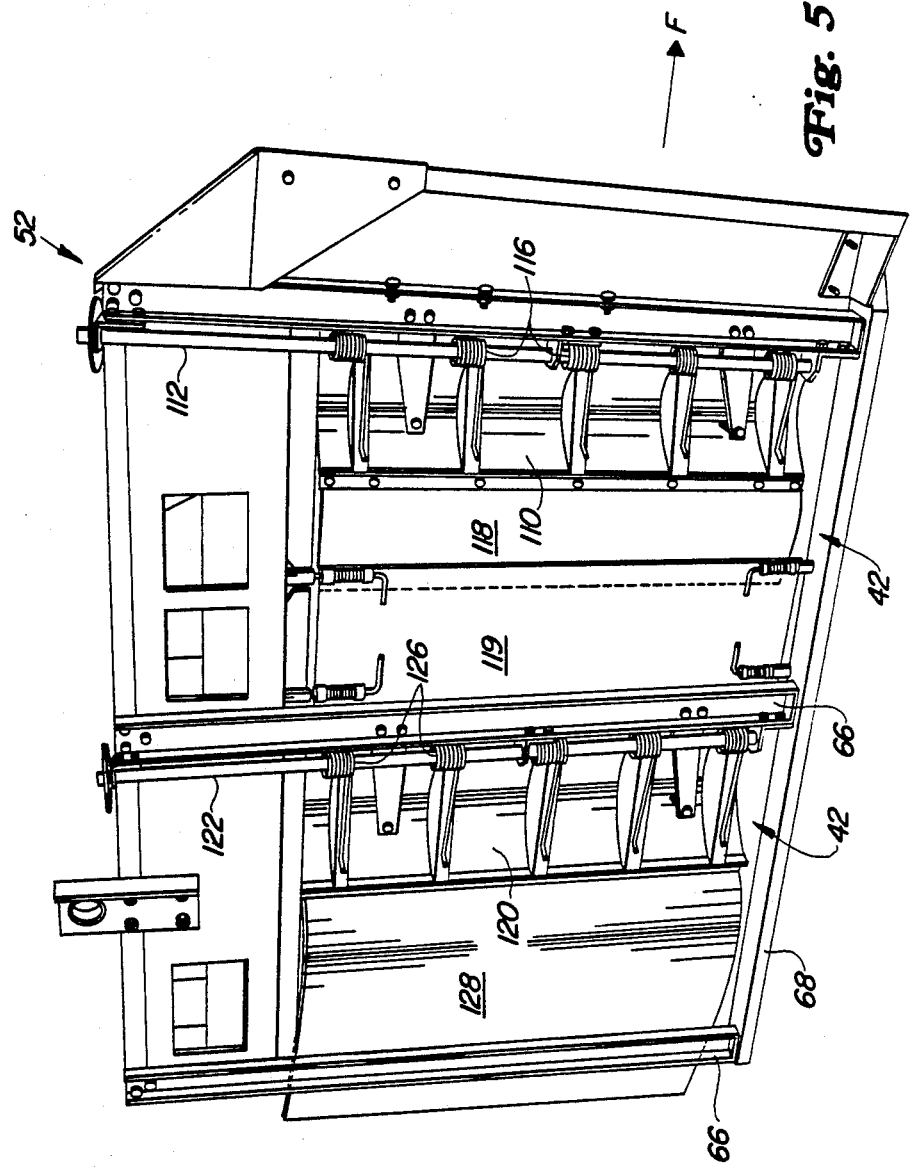

COTTON HARVESTER AND TANDEM ROW UNIT THEREFOR

This application is a continuation of application Ser. No. 935,460, filed Nov. 26, 1986, now abandoned.

BACKGROUND OF THE INVENTION

The present invention relates generally to cotton harvesters, and more specifically, to a cotton picker for harvesting narrow row cotton.

Spindle-type cotton harvesters typically include two to four row units spaced transversely across the front of a mobile frame with each row unit having two picker drums spaced on opposite sides of the row of cotton to be harvested. Such structure is shown, for example, in Hubbard et al U.S. Pat. No. 4,249,365. Each row unit is a relatively large and complex piece of machinery, and the configuration of the unit typically limits the minimum row spacing to approximately 36 inches. However, narrower row cotton has become increasingly popular, and harvesting cotton spaced in rows as narrow as 30 inches has usually required a skip-row method of harvesting such as shown in Bennett et al, U.S. Pat. No. 4,498,277. Alternately, various types of nested row units have been proposed, such as shown in U.S. Pat. No. 4,538,403. Although the skip-row method has alleviated some of the problems of harvesting narrow row cotton, special shields are required to direct cotton around the harvester frame, and cotton damage and loss can result from the multiple trips over the rows. Nested arrangements are very difficult to access for cleaning and maintenance, and providing an adequate cotton conveying system from the nested units has been a continuing problem.

OBJECTS OF THE INVENTION

It is therefore an object of the present invention to provide an improved cotton harvester for harvesting cotton planted in narrowly spaced rows.

It is yet a further object of the present invention to provide a cotton harvester with row units having a narrow configuration so that a plurality of the row units can be spaced side-by-side for harvesting narrow row cotton. It is a further object of the present invention to provide such a row unit which facilitates easy access to the unit for cleaning and maintenance and provides an advantageous duct routing for coveying cotton from the row unit to the basket.

It is yet another object of the present invention to provide a cotton harvester for harvesting narrow row cotton which has an improved trash discharge system. It is a further object to provide such a row unit with forward and rearward drums including trash discharge structure for the front drum which channels trash back into the row and allows the rear drum to pick cotton discharged by the front drum.

It is still another object of the present invention to provide an improved row unit for a cotton harvester wherein the drums on each unit are spaced in a tandem arrangement on one side of the row to be harvested. It is a further object to provide such a row unit with an improved system for conveying cotton from the two drums to the basket.

It is yet another object of the present invention to provide a cotton picker row unit wherein te picker drums are arranged in tandem on one side of the row of cotton to be picked, and wherein each of a plurality of row units and the corresponding drums utilized on a multi-row cotton harvester are constructed substantially identically to provide commonality of parts for reduced manufacturing, inventory and repair costs. It is a further object to provide such a row unit having improved trash discharge, improved duct routing and improved accessibility.

BRIEF DESCRIPTION OF THE INVENTION

In accordance with the above objects, a cotton harvester is provided having a mobile frame with a plurality of relatively narrow individual row units transversely spaced at the forward end of the frame. Each row unit includes a tandem drum arrangement with a forward drum and a rearward drum located on the same side of the row of cotton to be harvested. Both drums are located ahead of forward drive wheels on the harvester. Cotton from each of the drums on a unit is doffed transversely into narrow fore-and-aft extending side door structure. The cotton doffed into the rear door is blown by a jet of air forwardly to the forward door unit, and cotton doffed into the forward row unit is directed upwardly and rearwardly from the forward door, along with the cotton blown from the rearward door, toward the basket. The door units may be removed so that access is provided to the doffer and drum area between adjacent row units. Only one duct is required for each row unit, and the ducts for the center row units may be directed rearwardly under the cab area of the harvester. The row units and row unit drums are all constructed identically to eliminate left-hand and right-hand designations and provide commonality of parts. The tandem drum arrangement with side delivery provides a very narrow configuration which easily accommodates narrow row spacing while still maintaining easy access to the units and advantageous duct routing.

The front drum trash slot opens back into the row area so that trash from the front drum is channeled back into the row area to prevent the trash from impinging directly on the rear drum or from being trapped between the row unit and the next adjacent row unit. The rear drum can pick cotton discharged by the front drum to reduce cotton loss. Scrubbing action of the plants also helps keep the trash slot clean.

These and other objects, features and advantages of the present invention will become apparent to one skilled in the art upon reading the following detailed description in view of the drawings.

BRIEF DESCRIPTION OF THE DRAWINGS

FIG. 3 is a perspective view of the door structure and lower portion of the air duct structure, removed from the row unit.

FIG. 4 is a side view of a portion of a row unit removed from the harvester with parts removed to better show the drum and trash slot areas.

FIG. 5 is an enlarged side perspective view of the pressure plate area of the row unit.

DESCRIPTION OF THE PREFERRED EMBODIMENT

Figure 1:
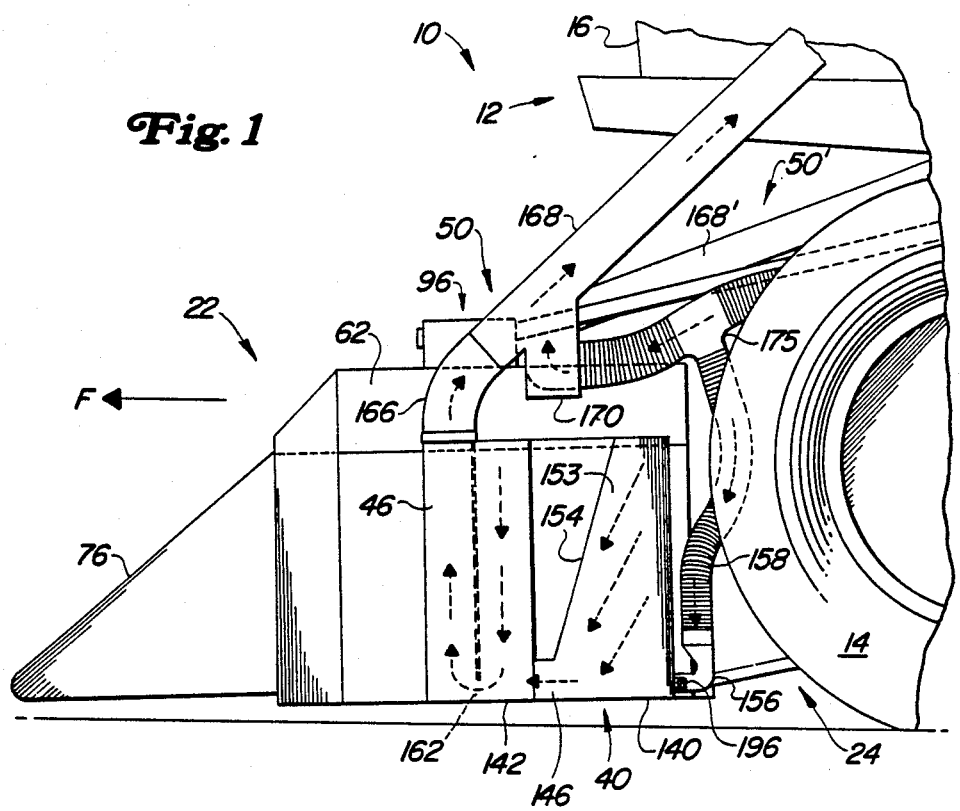
FIG. 1 is a side view of the front portion of the cotton harvester constructed in accordance with the teachings of the present invention.

Referring now to FIG. 1 therein is shown a cotton harvester 10 having a main frame 12 supported for forward movement over a field of cotton by transversely spaced forward drive wheels 14. An operator cab 16 is provided on the frame 12 generally above the area of the drive wheels 14. A cotton receiving basket (not shown) is supported on the frame rearwardly of the cab.

A plurality of generally identical narrow row units 22 are supported in transversely spaced relationship across the forward portion of the frame 12 by lift arm structure 24. Each unit 22 includes a row-receiving area 26 for receiving a row of cotton plants. Each row unit 22 also includes tandem drum structure having a forward drum 30 and a rear drum 32 located behind the forward drum 30 for removing cotton from one side of the row of plants in the row-receiving area 26. Doffer assemblies 36 and 38 located rearwardly adjacent the corresponding front and rear drums 30 and 32 doff cotton from the spindles on the drums and direct it into door structure 40 which is releasably connected to the side of the row unit 22 adjacent the doffers. Pressure plate structure 42 is supported on the opposite side of the row unit adjacent the row-receiving area 26 to urge the cotton plants toward the drums 30 and 32. A forward cotton conveying duct 46 extends upwardly at the forward end of the door structure 40 and is connected to air duct structure 50 which extends rearwardly and upwardly from the row unit 22 to the basket.

The row unit 22 includes frame structure 52 (FIGS. 4 & 5) including a fore-and-aft extending narrow floor portion 54 extending on the left-hand side (as viewed in the direction of travel F) of the row-receiving area 26. Channel-shaped members 56 are connected to the floor portion 54 and extend upwardly therefrom to a connection with upper gear housing structure 62 located above the floor portion 54. The upper housing structure 62 extends over the row-receiving area 26, and additional channel-shaped members 66 are connected to the housing structure 62 and extend downwardly therefrom to a connection with a fore-and-aft extending lower frame member 68 which extends parallel to, and on the opposite side of the row-receiving area 26 as, the floor portion 54. The forward portions of the frame structure 52 support forwardly projecting stalk lifters 76 on either side of the row-receiving area 26 for channeling the cotton plants into the area.

Figure 2:
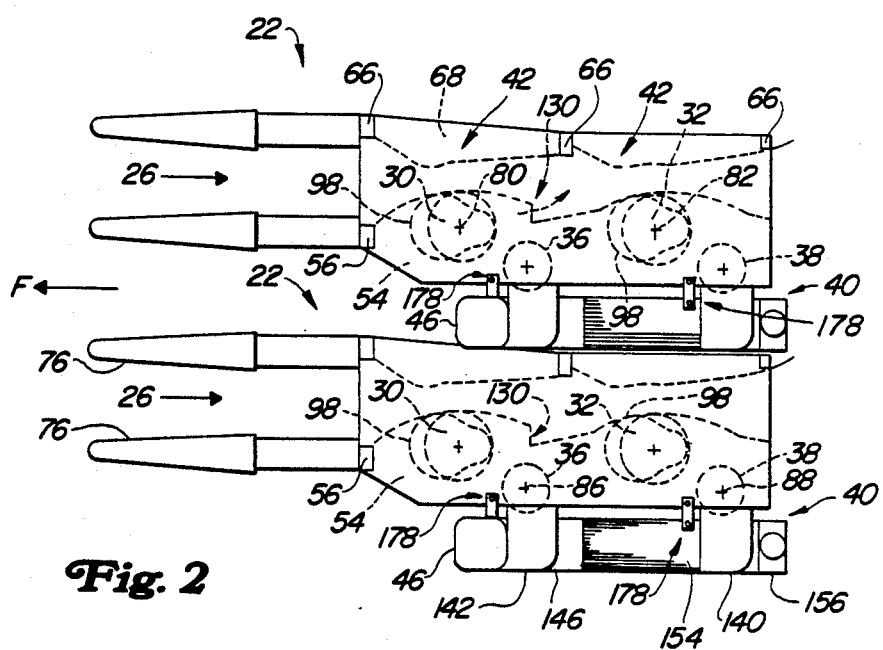
FIG. 2 is a top view of two adjacent row units of the cotton harvester shown in FIG. 1 and showing the general configuration of the drums, doffers and door structure on the harvester.

The individual picking drums 30 and 32 are generally identical and of conventional design. The drums 30 and 32 are supported from the gear housing structure 62 for rotation about vertical rotational axes 80 and 82, respectively, and, as best seen in FIG. 2, the axes 80 and 82 on each unit are aligned in the fore-and-aft direction. The axes 80 for all the row units 22 preferably lie in a common transversely extending vertical plane, as do the axes 82. The doffer assemblies 36 and 38 are supported between the housing structure 62 and the floor portion 54 for rotation about upright axes 86 and 88 rearwardly of the axes 80 and 82, respectively, with the axes 86 and 88 for a given row unit 22 lying in a fore-and-aft extending plane slightly outwardly of te drum axes 80 and 82.

The drums 30 and 32 include upright columns of spindles 90 rotatably mounted in spindle bars 92. Gear structure within the gear housing 62 is powered by a drive 96 from the harvester power unit to move the spindles 90 into the row-receiving area 26 and to rotate the spindles against the cotton plants. A cam 98 (FIG. 2) orients the spindle bars and spindles 90 in each of the drums 30 and 32 as the gear structure 94 nmoves the spindles rearwardly through the row-receiving area 26 at a speed approximately equal to the forward speed of the harvester 10. The spindles 90 project into the area 26 through grid bar structure 102 and 104 (FIG. 4). The cotton on the spindles is moved to the doffer area where the doffers 36 and 38 doff the cotton from the spindles and direct it into the door structure 40. Since the drums 30 and 32 are identical in construction, the corresponding cams 98 and other associated hardware are generally identical for both of the drums.

The pressure plate structure 42 (FIG. 5) is utilized to urge the cotton plants toward the drums 30 and 32. The structure 42 includes an upright plate 110 pivotally connected by a rod 112 to the front of the frame structure 52 and biased inwardly by coil springs 116 toward the row-receiving area 26. A flexible sheet-like extension 118 is connected to the aft edge of the upright plate 110 and extends rearwardly and outwardly therefrom to a location generally inwardly of a removable panel 119 extending forwardly from the central frame member 66 to prevent the cotton plants from spreading outwardly beyond the side of the row unit 22. A second upright plate 120 is pivotally connected to the frame by an upright rod 122 and is urged by coil springs 126 toward the second drum 32. A second flexible extension 128 is connected to the rear edge of the plate 120 and extends rearwardly therefrom to a position inside the aft channel-shaped member 66 at the aft end of the row unit 22. The pressure plate structure 42 yieldingly urges the cotton plants towards the respective drums 30 and 32 so that the spindles can engage all of the cotton on the plants.

To provide an area for discharging trash and loose cotton from the front drum 30, a trash slot indicated generally at 130 (FIGS. 2 and 4) extending vertically from the lower portion of the housing structure 62 to the floor portion 54 is provided near the rear of the drum 30 adjacent the row-receiving area 26. The trash slot 130 is defined by a vertical plate 134 connected to a central channel-shaped member 56 which forms part of the row unit frame structure 52. The plate 134 angles rearwardly and inwardly toward the area 26 to direct any trash and loose cotton from the forward drum 30 back into the row. This function reduces trash thrown toward the corresponding door structure 40, and also permits the loose cotton from the forward drum 30 to be picked by the spindles on the rear drum 32 for reduced cotton loss in the field.

The door structure 40 is located closely adjacent the respective doffers 36 and 38 and includes rear and forward upright discharge doors 140 and 142, respectively, connected at their lower ends by a short conveying section or chamber 146. The rear door 140 opens transversely into the area of the doffer 38 and includes a curved panel 150 extending forwardly toward the front part of the door 140. An aperture 152 is provided at the lower end of the panel 150 and the lower, front portion of the door, indicated generally at 153, opens into the lower aft end of the door 142 through the conveying chamber 146. The front portion 153 includes a sloped front wall 154 (FIGS. 1 and 3) angled downwardly in the forward direction F from the top of the rear door 140 toward the bottom of the front door 142. Cotton from the doffer 38 is directed against the panel 150 and falls downwardly and forwardly to the chamber 146. A rear door nozzle 156 is supported in the lower, aft end of the door 140 and is connected by a conduit 158 to a source of air under pressure on the harvester 10 for directing a generally horizontal jet of air through the discharge opening 152 and into the lower rear portion of the door 142 through the conveying chamber 146 to direct the cotton from the door 140 towards the door 142. The sloped front wall 154 permits the dropping cotton to be propelled forwardly (see arrows in FIG. 1) before reaching the bottom of the door 140 for better distribution of the cotton in the door and improved cotton conveying capacity.

The door 142 opens transversely into the area of the doffer 36. An upright curved panel 160 curves forwardly from the rear of the door 142 towardthe front of the door and includes a forwardly directed discharge opening 162 (FIG. 1). The lower portion of the panel 160 opens rearwardly into the forward portion of the conveying chamber 146 to permit the cotton blown from the rear door 140 to enter the lower area of the front door 142. The cotton from the forward doffer 36 impinges upon the panel 160 and drops downwardly toward the lower opening 162 and is directed along with the cotton from the rear door 140 into the lower portion of the forward cotton conveying duct 46 which extends upwardly along the forward panel of the front door structure 142. The upper end of the duct 46 is connected to an elbow 166 which in turn is connected to a duct section 168 of the air duct structure 50. The duct sections 168' for the central row units, as best seen in FIG. 1, have a substantial horizontal component so that the sections may be routed under the cab 16. A large air nozzle 170 opens rearwardly into the forward lower portion of the duct section 168 and is connected by a large air hose 174 to the source of air under pressure on the harvester 10. The hose 158 is connected by a T-connector 175 to the hose 174 upstream of the nozzle 170. The nozzle 170 delivers a blast of air rearwardly into the duct 168 adjacent the elbow 166 to induce a draft upwardly in the cotton conveying duct 46 which acts with the jet of air from the nozzle 156 to propel the cotton from the rear and forward doors 140 and 142 into the duct 46 and through the air duct structure 50 into the basket. By combining the cotton from the doors 140 and 142, a single air duct structure 50 may be utilized and the door structure 40 may be optimumly narrowed to provide a narrow row unit configuration as best seen in FIG. 2. In addition, the air duct structure 50' (FIG. 1) for the row units centrally located on the harvester frame may be advantageously routed under the operator cab 16.

The entire door structure 40 is releasably connected to the outer side of the row unit 22 by a series of releasable fastener assemblies 178 located at the upper portion of the door structure 40 and by lower locating flanges 179 slidably received by the floor portion 54. This attaching structure permits the door structures 142 and 140 to be removed in turn so that the operator has access to the area adjacent the doffer assemblies 36 and 38 and front and rear drums 30 and 32 of the row unit 22, and to the area of the pressure plate structure 42 of the adjacent row unit. The elbow 166 is releasably connected to the upper portion of the duct 46 by a pin and strap arrangement 180, and the top rear portion of the elbow 166 is connected by a second pin and strap arrangement 182 to the duct section 168. The forward end of the chamber 146 is slidably received within the area adjacent the opening at the bottom of the panel 160. By releasing the straps and fasteners, the entire door structure 40 may be removed forwardly from between adjacent row units. After the front door 142 is removed, the latching structure 178 on the rear door may be released and the door 140 moved forwardly out from between adjacent units. The air nozzle 156 is slidably received within the lower rear portion of the door 140 and is releasably secured by a nozzle latch 196.

Having described the preferred embodiment, it will be apparent that modifications can be made without departing from the scope of the invention as defined in the accompanying claims.

We claim:

1. A narrow row unit for a cotton harvester, comprising:
    a fore-and-aft extending unit frame including a fore-and-aft row-receiving area for receiving a single row of cotton plants therein;
    harvesting means located on one side only of the row-receiving area, said harvesting means including a first forwardly located upright harvesting drum rotatably supported by the unit frame adjacent said one side of the row-receiving area and including spindle means projecting into the row-receiving area for removing cotton from the plant and a second harvesting drum rotatably supported by the unit frame rearwardly adjacent of, and on the same side of the row-receiving area as the first drum, said second drum including additional spindle means projecting into the row-receiving area rearwardly of the first-mentioned spindle means for removing cotton left on the plants by the first-mentioned spindle means;
    pressure means located on the side of the row-receiving area opposite the harvesting means for urging the cotton plants toward the first and second drums whereby cotton is removed substantially exclusively by the harvesting means; and
    means for conveying the removed cotton from the first and second drums.

2. The invention as set forth in claim 1 wherein the pressure means comprises a pressure plate and means for biasing the pressure plate toward the row-receiving area.

3. The invention as set forth in claim 1 including a trash slot located adjacent the first drum and the row-receiving area in scrubbing relationship with the row of cotton plants for channeling trash and cotton discharged from the first drum into the row-receiving area and permitting the second drum to pick the cotton discharged by the first drum.

4. The invention as set forth in claim 1 wherein the means for conveying comprises fore-and-aft extending door structure located transversely adjacent the first and second drums.

5. The invention as set forth in claim 4 wherein the door structure includes a first upright door structure located adjacent one of the drums for intercepting cotton from said one of the drums, a second upright door structure located adjacent the other of said drums, means for moving cotton from the first door structure to the second door structure, and means for propelling the cotton from the first and second door structures upwardly from the second door structure.

6. The invention as set forth in claim 5 wherein the first door structure is located adjacent the second drum rearwardly of the second door structure.

7. The invention as set forth in claim 5 wherein the means for moving comprises a conveying chamber connecting the first and second door structures and means for introducing a jet of air into the conveying chamber in the direction of second door.

8. The invention as set forth in claim 5 wherein the first door structure includes wall means angling toward the second door structure in the downward direction for permitting cotton received from the correponding drum to be propelled toward the second door structure immediately after being intercepted by the first door structure.

9. The invention as set forth in claim 5 including means for selectively removing the doors for convenient access to the drums.

10. The invention as set forth in claim 4 wherein the drums are rotatable about axes of rotation, and doffer means for doffing cotton from the spindles and directing the cotton into the door structure, said doffer means including first and second doffers located rearwardly of the first and second drums, respectively, the doffers having axes of rotation located outwardly in the direction of the door structures from the respective axes of rotation of the corresponding drums.

11. A cotton harvester including a fore-and-aft extending main frame and adapted for harvesting cotton from at least two consecutive rows of cotton spaced apart approximately thirty inches or less, said harvester including a first row unit defining a first fore-and-aft extending row-receiving area for receiving a row of cotton plants therein, said row unit comprising tandem drum structure including a first upright harvesting drum located on one side of the row-receiving area; a second upright harvesting drum located rearwardly of, and on the same side of the row-receiving area as, the first drum, the drums rotatable about upright axes and including spindle means projecting into the row-receiving area for removing cotton from the plants; means urging the cotton plants towards the first and second drums for causing the first and second drums exclusively to remove the cotton from the row of plants; doffer means associated with drums for doffing cotton from the spindles, said doffer means including first and second upright doffer columns supported for rotation about axes located outwardly of the drum axes on the opposite side of the drum axes from the row-receiving area; at least a second row unit located closely adjacent the first row unit and defining a second fore-and-aft extending row-receiving area, said second row unit including upright drum structure located on the side of the second row-receiving area adjacent the first row-receiving area, and lift arm structure connected to the row units and supporting the row units substantially entirely from the foward end of the main frame.

12. The invention as set forth in claim 11 wherein the upright drum structure of the second row unit comprises tandem drum structure with third and fourth harvesting drums located on the side of the second row-receiving area closest to the first row-receiving area.

13. The invention as set forth in claim 12 wherein the third and fourth harvesting drums are transversely aligned with the first and second drums, respectively.

14. The invention as set forth in claim 12 including fore-and-aft extending cotton conveying structure located between the drum structure of the second unit and the first row-receiving area for receiving doffed cotton from the third and fourth drums.

15. The invention as set forth in claim 14 including means for removably attaching the cotton conveying structure to the second row unit for providing access to the third and fourth drums and to the first row-receiving area.

16. The invention as set forth in claim 14 including a second fore-and-aft extending cotton conveying structure located outwardly of the first and second drums on the side of the first row unit away from the second row unit.

17. The invention as set forth in claim 16 wherein the first and second row units and the first and second cotton conveying structures are substantially identical in construction.

18. The invention as set forth in claim 17 including at least a third row unit and a corresponding third conveying structure substantially identical to the first and second row units and the first and second conveying structures, respectively, said row units defining a repeating pattern of row receiving areas sandwiched between tandem drum structure and conveying structure.

19. The invention as set forth in claim 11 including trash deflecting structure located behind the first drum for diverting trash and discharged cotton from the first drum into the row-receiving area.

20. The invention as set forth in claim 14 including an air duct and wherein the cotton-conveying structure comprises means for combining the cotton doffed from the third and fourth drums and directing the combined cotton into the air duct.

21. The invention as set forth in claim 20 wherein the cotton conveying structure comprises individual fore-and-aft spaced upright door structures associated with the respective third and fourth harvesting drums, and means connecting the door structures.

22. The invention as set forth in claim 21 including means for propelling cotton from the door structure associated with the rearmost drum forwardly through the means connecting the door structures to the forward door structure.

23. The invention as set forth in claim 22 wherein the door structures are upright and define lower ends and the conveying chamber connects the lower ends.

24. The invention as set forth in claim 23 wherein the air duct extends rearwardly and upwardly from the upper end of the forward door structure.

25. The invention as set forth in claim 21 wherein the door structure for the rearmost drum defines a compartment extending forwardly to adjacent the aft end of the forward door structure.

26. The invention as set forth in claim 25 wherein the compartment angles downwardly and forwardly from the top of the rear door structure toward the bottom of the forward door structure.

27. A cotton harvester having a fore-and-aft extending main frame supported for forward movement over a field of cotton plants by forward drive wheels, a plurality of narrow row units transversely spaced and supported in side-by-side relationship on the main frame forwardly of the drive wheels and adapted for harvesting cotton from consecutive narrowly spaced rows of cotton plants, each row unit including a row-receiving area, first and second fore-and-aft spaced picker drums, means supporting the drums on one side only of the row-receiving area for rotation about upright axes, pressure plate means located on the opposite side of the row-receiving area for urging the plants towards the drums, a narrow fore-and-aft extending door structure extending adjacent the drums and on the opposite side of the drums as the corresponding row-receiving area, doffer means for directing cotton picked by the drums transversely into the door structure, and means for conveying the picked cotton away from the door structure.

28. The invention as set forth in claim 27 including a trash discharge slot located rearwardly of the forward-most drum and opening into the row-receiving area for permitting trash and loose cotton from the forward drum to be deposited into the row-receiving area.

29. The invention as set forth in claim 27 wherein the door structure includes first and second fore-and-aft spaced upright doors located adjacent the first and second drums, respectively, and means for combining the cotton from the two doors, said means for conveying including an upright conveying duct in communication with the two doors.

30. The invention as set forth in claim 29 wherein the means for conveying includes air jet means opening into the lower portion of the first door for directing a jet of air toward the second door and propelling cotton from the first door to the second door.

31. The invention as set forth in claim 30 further including air nozzle means located downstream of the upright duct for inducing air flow upwardly in the duct, said induced air flow and jet of air cooperating to mix cotton from the two doors and convey the cotton upwardly in the duct.

32. The invention as set forth in claim 30 wherein the first door is located adjacent the rearmost drum and the air jet means opens in the forward direction.

33. The invention as set forth in claim 32 wherein the first door opens into the lower rear portion of the second door, and the duct extends upwardly adjacent the forward portion of the second duct.

34. The invention as set forth in claim 27 wherein said plurality of row units comprises at least three row units, and the row units are substantially identical and define a repeating pattern of row-receiving areas and corresponding pressure plate means sandwiched between picker drum pairs on the individual row units and the door structure on the next adjacent row units, and wherein the row-receiving areas are spaced apart no more than thirty inches.

35. The invention as set forth in claim 27 wherein the pressure plate means comprises first and second panels opposite the first and second drums, respectfully, and means for biasing the panels toward the row-receiving area.

* * * * *